Dec. 20, 1960 C. L. WANLASS 2,965,768

MULTIVIBRATOR CIRCUITS WITH OUTPUT SIGNAL FEEDBACK
FOR INCREASING TRIGGER SENSITIVITY

Filed Aug. 10, 1955

CRAVENS L. WANLASS
INVENTOR.

BY [signature]
[signature]

ATTORNEYS

United States Patent Office 2,965,768

Patented Dec. 20, 1960

2,965,768

MULTIVIBRATOR CIRCUITS WITH OUTPUT SIGNAL FEEDBACK FOR INCREASING TRIGGER SENSITIVITY

Cravens L. Wanlass, Whittier, Calif., assignor, by mesne assignments, to Thompson Ramo Wooldridge Inc., Cleveland, Ohio, a corporation of Ohio Filed Aug. 10, 1955, Ser. No. 527,556

14 Claims. (Cl. 307—88.5)

Figure 1:
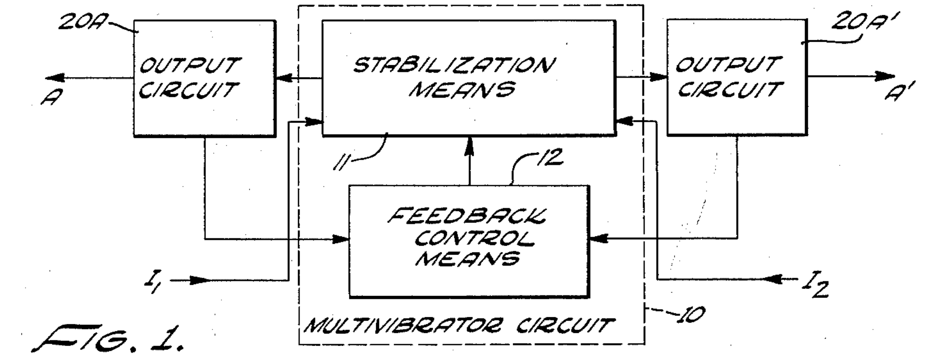

This invention relates to multivibrator circuits utilizing output signal feedback for increasing trigger sensitivity and, more particularly, to an improved transistor flip-flop wherein the trigger sensitivity is enhanced by utilizing the output signals representing the states of the flip-flop to control a feedback biasing means coupled to the emitters of the cross-coupled transistors therein.

While the concept of the invention has not been previously recognized in the art, output signal feedback has been employed in order to control the triggering of multivibrators. In particular, the output signal feedback from an output circuit has been utilized to control the trigger pulse application to the input circuit which would cause the output signals to change. Thus, if a multivibrator is considered as having output signals A and A′ representing its state and the complement thereof, respectively, and as having input circuits 0*a* and 1*a* for setting the multivibrator to 0 and 1 representing states, respectively; the output signal A is frequently fed back to control the application of pulses to the input circuit 0*a*, so that no pulse is applied unless signal A is in its high state. In a similar manner the output signal A′ is utilized to control the application of pulses to input circuit 1*a*.

In this manner then the known technique prevents pulses from being applied to both input circuits 1*a* and 0*a* similtaneously, which might prevent the multivibrator from being properly triggered.

This conventional output signal feedback technique may be employed in addition to the signal feedback technique of the present invention for increasing the trigger sensitivity. In other words, the feedback function of the present invention has an entirely different purpose than the feedback function previously employed in the art.

In accordance with the basic concept of the present invention, the trigger response of a bistable multivibrator circuit including first and second amplifiers is enhanced by introducing first and second feedback control means coupled in current series with the amplifiers, respectively. The feedback circuits are actuated by output signals derived from the multivibrator circuit in a manner which aids the effect of an applied pulse. Thus in its basic form the invention may readily be distinguished from the prior art feedback technique which was adapted to prevent improper triggering.

In more particular terms, the invention contemplates the introduction of impedances into series connection with the amplifiers, as for example by connecting a resistor to the emitter electrode of a transistor. Each feedback impedance associated with an amplifier receives an output signal from the other amplifier. In a transistor multivibrator embodiment contemplated by the invention, the feedback control is accomplished by coupling the collector electrode of each transistor through an output circuit to a feedback resistor connected in series with the emitter electrode of the other transistor.

Two basic types of feedback are contemplated; namely, A.–C. and D.–C. feedback. The A.–C. feedback is primarily desirable to enhance the trigger sensitivity in that any increase in conduction through one transistor of a multivibrator due to the application of an input pulse results in a corresponding increase in the back biasing voltage developed across the emitter feedback resistor of the other transistor. The D.–C. feedback operates in a similar manner in tending to reduce the conduction of one transistor when the output signal of the other transistor is depressed due to the high conduction therethrough and accordingly may be employed as a D.–C. stabilization means for the multivibrator.

While the invention is not so limited, it has been found to operate very successfully where Zener diodes are utilized as voltage breakdown stabilizing elements. The basic concept of such an arrangement is introduced in my copending application for "Multivibrator Circuits Employing Voltage Breakdown Devices" Serial No. 513,426 filed June 6, 1955.

The Zener diodes may be utilized in a D.–C. current feedback path, in the grounded base embodiment of the invention, or in the base electrode input circuit where only A.–C. current feedback is employed to enhance trigger sensitivity.

In a particular form of output circuit which may be employed with the transistor multivibrator of the invention, two output transistors are utilized having their base electrodes coupled together and to one of the load impedances in the multivibrator and having their emitter electrodes coupled together and to an output storage capacitor.

The collector electrode of one of the output transistors then is coupled back to the emitter of the cross-coupled transistor. Operating potential then is applied to the collector of the other output transistor.

The trigger pulse sensitivity is enhanced by this arrangement due to the fact that when a triggering signal is applied to the multivibrator the output signal of the storage capacitor is changed through the output transistor which has its collector coupled back to the feedback impedance in the emitter circuit of the cross-coupled transistor. Thus as the output circuit changes from producing a high signal to a low signal, the current provided in this change tends to back bias the cross-coupled transistor and cut its current conduction off, so that the output signal produced by the other output circuit rises accordingly.

Accordingly, it is an object of the present invention to provide an improved multivibrator circuit having increased trigger sensitivity.

Another object is to provide an output signal feedback arrangement for a multivibrator circuit which will aid in the transition operation of the multivibrator.

A further object is to provide a transistor multivibrator wherein a D.–C. and A.–C. output signal feedback is introduced allowing a grounded base cross-coupling arrangement with improved frequency response and trigger sensitivity.

Yet another object is to provide a transistor multivibrator employing Zener diodes for static stability, the trigger sensitivity of the circuit being enhanced by feeding back the output signals to emitter biasing impedances.

Yet a further object of the invention is to provide a transistor multivibrator which is stabilized through a Zener diode circuit in the output stage, a D.–C. stabilizing feedback being made to each of the cross-coupled transistors, the arrangement also enhancing the trigger sensitivity.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Figure 2A:
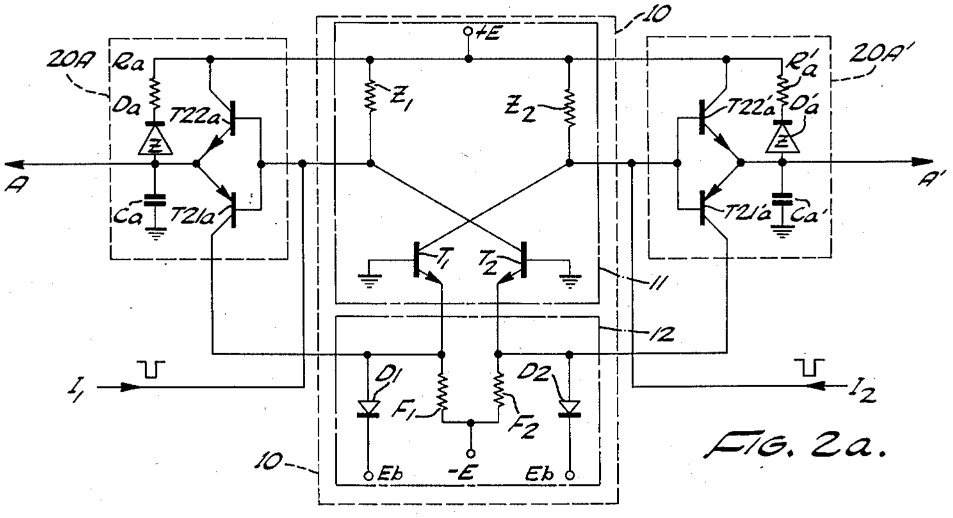
Figure 2B:
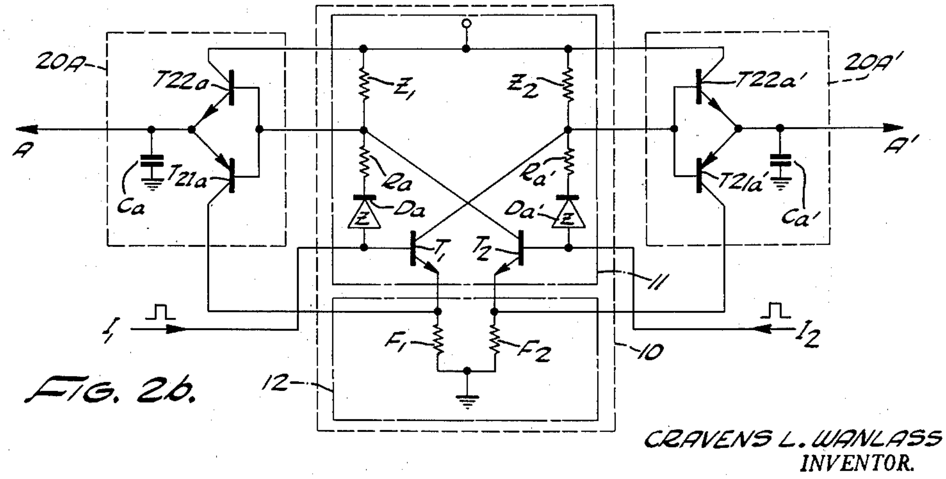

Fig. 1 is a block diagram illustrating the basic form of the invention;

Fig. 2*a* is a schematic diagram of one species of the invention wherein grounded-base cross-coupled transistors are employed; and Fig. 2*b* is a schematic diagram of another embodiment of the invention wherein only A.-C. current feedback is employed in order to enhance the trigger sensitivity.

Reference is now made to Fig. 1 wherein the basic embodiment of the invention is indicated in block diagram form. As indicated in Fig. 1 the embodiment includes a multivibrator circuit 10 having stabilization means 11 and feedback control means 12 coupled thereto. Output signals are derived through stabilization means 11 through output circuits 20A and 20A′ producing corresponding output signals A and A′. These output circuits also provide feedback signals which are coupled to feedback control means 12. As will be further understood from the detailed description which follows, the output circuits may include means also forming part of stabilization means 11.

Input signals are applied to leads $I_1$ and $I_2$ for actuating the multivibrator into first and second stable states, respectively. The important feature of the invention is the provision of a feedback coupling to the control means 12 whereby an input signal applied to either $I_1$ or $I_2$ is aided in its triggering effect by the current fed back from one of the output circuits.

While the generic concept of the invention is represented in Fig. 1, this concept can be better understood by considering the more specific means shown in Figs. 2*a* and 2*b*, although the invention is not limited to the particular means forming either of these embodiments but is generic thereto.

Reference is now made to Fig. 2*a* wherein it will be noted that multivibrator circuit 10 is a transistor multivibrator employing transistors $T_1$ and $T_2$ as cross-coupled transistors in stabilization means 11, each transistor having its base electrode connected to ground. The collector electrodes of transistors $T_1$ and $T_2$ then are cross-coupled to load impedance resistors Z2 and Z1, respectively. The important feature of the invention then is the inclusion in feedback control means 12 of two feedback impedances F1 and F2, each having one end coupled to the emitter electrodes of transistors $T_1$ and $T_2$, respectively. These impedances have their other ends coupled together and receive a suitable negative source potential −E. A suitable positive source potential +E is applied to the other ends of impedances Z1 and Z2 which are coupled together.

Output circuits 20A and 20A′ are shown as including two output transistors $T_{21a}$, $T_{22a}$; and $T_{21a'}$, $T_{22a'}$, respectively, each corresponding pair having base and emitter electrodes coupled together. The junctioned base electrodes of the output transistors in circuits 20A and 20A′ are coupled to load impedances Z1 and Z2, respectively; and the emitter junctions thereof are coupled to output storage capacitors C*a* and C*a*′, respectively. It will be understood that this arrangement is not essential in the practice of the invention since the signal feedback technique may be employed with other output circuits.

In the embodiment of Fig. 2*a* a Zener diode stabilization arrangement is also included in the output circuits so that both a D.-C. and A.-C. feedback control is possible. In particular, output circuits 20A and 20A′ include Zener diodes D*a* and D*a*′, respectively, having anodes connected to the emitter junctions of the associated output transistors and having cathodes which receive suitable operating potential through series resistors R*a* and R*a*′, respectively.

Additional diodes D1 and D2 are also included in feedback control means 12, being coupled to feedback impedances F1 and F2, respectively. The purpose of these diodes is to permit the proper back biasing of cross-coupled transistors $T_1$ and $T_2$. Thus, the cathodes of these diodes receive a suitable potential E*b* which is selected to back bias the transistors without substantially inhibiting the triggering action. This bias may be in the order of one volt for the typical transistor.

In addition diodes D1 and D2 also serve to provide a low impedance discharge path for capacitors C*a* and C*a*′, respectively, which otherwise would have to discharge through feedback impedances F1 and F2. Thus, the feedback signal due to a discharging capacitor rises rapidly to the back biasing level E*b* to aid the triggering of the transistor and then a low impedance discharge path is available through the respective diode.

In the multivibrator static state then either one of Zener diodes D*a* or D*a*′ is caused to break down due to the potential thereacross. This occurs when the associated storage capacitor has been discharged through output transistor $T_{21}$.

In order to illustrate this state specifically, it will be assumed that signal A is high and A′ is low so that storage capacitor C*a* is charged to substantially +E whereas storage capacitor C*a*′ has been discharged to substantially E*b*.

In this state then Zener diode D*a*′ breaks down since its Zener breakdown potential is selected to exist in the region between +E and the low level output signal developed across capacitor C*a*′. The theory of this operation is more fully explained in my above-mentioned copending application Serial No. 513,426.

Since Zener diode D*a*′ is broken down, actuating potential is provided for output transistor $T_{21a'}$ so that current passes therethrough to feedback impedance F2. This then raises the emitter potential of cross-coupled transistor $T_2$ so that its conduction is reduced.

At the same time then Zener diode D*a* is in its high impedance prebreakdown state so that output transistor $T_{21a}$ receives substantially no actuating signal. Furthermore, the low conduction state of transistor $T_2$ causes a rise in potential at the junction of impedance Z1 and the base electrode of transistor $T_{21a}$ so that this transistor is substantially cut off. This means then that no feedback biasing signal is applied to impedance means F1 and transistor $T_1$ then assumes a highly conducting state.

The stabilization circuit is then completed through the coupling of the collector of transistor $T_1$ to the base electrode of output transistor $T_{21a'}$. This point assumes a relatively low potential due to the voltage drop across impedance Z2 so that transistor $T_{21a'}$ is maintained in its forward biased state.

In this manner then the feedback coupling arrangement of the invention allows a D.-C. stabilization so that transistors $T_1$ and $T_2$ may be operated utilizing their higher frequency characteristic with their base electrodes grounded.

The multivibrator of Fig. 2*a* then may be triggered by the application of negative signals via leads $I_1$ and $I_2$, coupled to the output transistor base junctions in circuits 20A and 20A′. The effect of these signals will be illustrated by assuming, as before, that output signal A is in a high state and signal A′ is in a low state. The multivibrator may be triggered then by applying a negative pulse to input lead $I_1$.

This negative pulse tends to cause the discharge of output capacitor C*a* through output transistor $T_{21a}$, and thence through feedback impedance F1. This causes an increase in the back biasing signal appearing at the emitter of transistor $T_1$ and thus reduces the conduction therethrough. As this conduction is reduced, the voltage drop across cross-coupled impedance Z2 drops and the potential at the base of $T_{21a'}$ rises. This then tends to back bias output transistor $T_{21a'}$; and thereby to reduce the feedback current to impedance F2.

Transistor $T_2$ then may begin to conduct more current so that the voltage drop across impedance Z1 increases and the potential applied to the base electrode of output transistor $T_{21a}$ then drops allowing an increased conduction therethrough. In this manner then conduction shifts from transistor $T_1$ to transistor $T_2$, and transistors $T_{21a}$ and $T_{21a'}$ are driven into conduction, and non-conduction, respectively. This means then that capacitor *Ca* is discharged through $T_{21a}$, aiding in the cutting off action of cross-coupled transistor $T_1$, whereas output capacitor *Ca'* is charged through conducting output transistor $T_{22a'}$ towards +E.

In this manner then the feedback arrangement provided by the invention introduces a transition signal, aiding the triggering of the multivibrator, where this signal is derived by causing the output signal changes to be fed back to feedback biasing means.

More specifically, an output signal discharge path is provided for capacitors *Ca* and *Ca'* so that when the multivibrator state is changed so as to reduce the corresponding output signal from a high level to a low level a current signal is fed back through the associated output transistors, either $T_{21a}$ or $T_{21a'}$, to provide a current conduction reducing biasing signal which is developed across one of feedback impedances F1 or F2.

When the A.-C. feedback transition has gone far enough in the case considered above to cut off Zener diode *Da'*, causing it to assume a very high impedance, and to cause a breakdown of Zener diode *Da*, the multivibrator assumes its other stable state where signal A is low and signal A' is high The D.-C. feedback signal is utilized to stabilize the multivibrator until the next triggering signal is applied.

While the D.-C. and A.-C arrangement of Fig 2*a* has certain advantages in that it allows the utilization of grounded-base transistors, applications may arise where the invention is preferably employed with only A-C. feedback. This type of circuit is shown in Fig. 2*b* where the important change to note is that the Zener diode stabilization means is not included in output circuits 20A and 20A', but rather forms a series connection between load impedances Z1 and Z2 and transistors $T_1$ and $T_2$, respectively. In particular, diodes *Da* and *Da'* have their anodes connected respectively to the base electrodes of $T_1$ and $T_2$ and their cathodes coupled through series resistors R*a* and R*a'* to load impedances Z1 and Z2.

It will also be noted in this case that it is not necessary to include diodes D1 and D2 in feedback control means 12, and further that load impedances F1 and F2 are connected to ground rather than to a negative potential −E. The reason for this is that no D.-C. feedback is present which must be limited in order to ensure ease in triggering.

While the arrangement of Fig 2*b* is stabilized in a different manner than that shown in Fig. 2*a*, its A.-C. transition action is substantially identical. Thus when signal A is high and a triggering signal is applied to the multivibrator, output capacitor *Ca* is discharged through output transistor $T_{21a}$ providing a current feedback to impedance F1 which tends to cut off transistor $T_1$. The collector potential of transistor $T_1$ then rises and this rise in potential is cross-coupled to output transistor $T_{21a'}$, which is cut off. Transistor $T_{22a'}$ then is caused to conduct and charge output capacitor *Ca'* towards the higher level.

An important variation to be noted in the embodiment of Fig. 2*b* is that the triggering pulses are applied to the base electrodes of transistors $T_1$ and $T_2$, and may be positive pulses as indicated, although this is not necessary. When positive pulses are utilized then the multivibrator is triggered from a high state, where output signal S is in a high level, to a low state by applying a positive pulse to the lead $I_2$. This then causes transistor $T_2$ to conduct more heavily, reduces the voltage across Zener diode D*a*, driving it into its high impedance back bias region, and causes transistor $T_{21a}$ to provide the discharge path for output capacitor *Ca*, as pointed out above.

From the foregoing description, it is apparent that the present invention provides an improved technique for increasing the trigger sensitivity of a multivibrator circuit. It has been shown that in accordance with basic concept of the invention the multivibrator output signals are fed back to feedback control means coupled in current series with the cross-coupled amplifiers forming the stabilization means of the multivibrator.

This feedback coupling is arranged as pointed out above so that any output signal level change causes an aiding current conduction change in one of the cross-coupled amplifiers.

While the invention has been particularly illustrated as employed with transistor multivibrators, it will be understood that the technique taught herein may be utilized as well with other amplifiers such as those including vacuum tubes.

Furthermore, it will be understood that the preference of the Zener diode type of stabilization means, as discussed herein, is not intended as a limitation upon the basic function of the invention. The reason for this is that the current feedback technique is an improvement having independent utility in any multivibrator wherein first and second amplifiers are cross-coupled to respective load impedances.

It should also be understood that while the invention has been described as providing either an A.-C. or a D.-C. feedback, or both, the two specific arrangements shown in Figs 2*a* and 2*b* are not the only ones possible.

Thus it is contemplated, in accordance with the invention, that only the D.-C. stabilization feedback may be employed, where it is possible to utilize grounded-base transistors as the cross-coupled amplifiers.

However, in other arrangements it may be preferable to employ only A.-C. feedback, in accordance with the invention, whereby an enhanced trigger sensitivity results.

In view of the above, it is therefore anticipated that those skilled in the art will be able to devise a considerable number of variations in circuit technique without departing from the spirit of the present invention.

What is claimed is:

1. A multivibrator circuit comprising: first and second amplifiers, each including an output electrode and first and second input electrodes; first and second load impedances having first ends coupled to the output electrodes of said second and first amplifiers, respectively; first and second storage circuits having input circuits coupled to the output electrodes of said first and second amplifiers, respectively, each storage circuit having an output circuit and a feedback circuit in addition to said input circuit; first and second coupling impedances, each coupling impedance being connected between the output electrode of a respective amplifier and the first input electrode of the other amplifier; first and second feedback impedances having first ends coupled to the second input electrodes of said first and second amplifiers, respectively; first and second coupling circuits for directly connecting the feedback circuits of said storage circuits to the second input electrodes of said second and first amplifiers, respectively; first and second triggering input circuits for applying pulses to the first input electrodes of said amplifiers; and means for applying operating potential signals to the second ends of said load and feedback impedances.

2. A multivibrator circuit comprising: first and second transistors each having base, collector, and emitter electrodes; first and second load impedances having first ends coupled to the collector electrodes of said second and first transistors, respectively, to form first and second junctions, respectively; first and second three-terminal output circuits, each having a first terminal connected to a respective junction, the second terminal thereof constituting an output lead; first and second feedback impedances having first ends connected to the emitter electrodes of said first and second transistors, respectively, to form third and fourth junctions, respectively; means for applying pulses to said transistors to cause current flow from base to emitter, means for coupling the third terminals of said first and second output circuits to said third and fourth junctions, respectively, to constitute a current aiding circuit each time a pulse is applied to the base electrodes of said transistors; and means for applying source potentials to the second ends of said load and feedback impedances.

3. The arrangement defined in claim 2 wherein said output circuits each include first and second transistors having base electrodes coupled together and to the associated load impedance, and having emitter electrodes coupled together, each output circuit further including an output storage capacitor; the emitter electrodes of said output transistors being coupled together and to said output storage capacitor; there being also means provided for applying operating potential to the collector of one of said output transistors, and the collector of the other of said output transistors being coupled to the associated feedback impedance.

4. The arrangement defined in claim 2 wherein each of said transistors has its base electrode connected to ground, said pulses being applied through said output circuits to the emitter electrodes of said transistors to draw current through said base electrodes, the arrangement thereby providing a multivibrator with grounded base transistors.

5. The arrangement defined in claim 3 wherein each of said output circuits further includes a Zener diode coupled between the means for applying operating potential and the emitter electrode of the associated output transistor.

6. The arrangement defined in claim 2 wherein said first and second load impedances are coupled to the bases of said first and second transistors through first and second Zener diodes connected so as to receive a breakdown potential from the collectors of said second and first transistors, respectively, and to provide stabilizing base current for the associated transistor when conducting.

7. A transistor multivibrator with improved trigger sensitivity and frequency response, said multivibrator comprising: first and second multivibrator transistors each having emitter, collector and base electrodes; first and second load impedances each having one end coupled to the collector electrodes of said second and first multivibrator transistors, respectively, and receiving operating potential at the other end thereof; first and second pairs of output transistors, each pair having base electrodes coupled together and having emitter electrodes coupled together, the base electrodes of said first and second pairs of output transistors being coupled to the collector electrodes of said first and second multivibrator transistors, respectively; means for applying operating potential to a first transistor in each pair of said output transistors; first and second feedback resistors coupled to the emitters of said first and second multivibrator transistors, respectively; means coupling the collector electrodes of the other transistor in said first and second pairs of output transistors to the emitters of said second and first multivibrator transistors, respectively; means coupling the collector electrodes of said first and second multivibrator transistors to the base-to-emitter current paths of said second and first multivibrator transistors, respectively, to control the base-to-emitter current flow of the respective multivibrator transistor to establish two stabilized states for said multivibrator; and means for applying triggering signals to change the current condition of the base-to-emitter path for said multivibrator transistors to cause the multivibrator to change from one state to another.

8. The multivibrator defined in claim 7 wherein Zener diodes are included in the means coupling the collector electrodes of said multivibrator transistors to the base-to-emitter current paths to establish the stable states for said multivibrator.

9. The multivibrator defined in claim 8 wherein said Zener diodes are arranged in respective output circuits between the junction of the emitters of the output transistors and the operating potential points.

10. The multivibrator defined in claim 8 wherein said Zener diodes are arranged to couple the base electrodes of said first and second multivibrator transistors to the collector electrodes of said second and first multivibrator transistors.

11. A transistor multivibrator circuit comprising: first and second transistors each having collector, base, and emitter electrodes; first and second impedances each having a first end coupled to the collector electrodes of said second and first transistors, respectively; first and second feedback control circuits having first ends coupled to the emitter electrodes of said first and second transistors, respectively; first and second output circuits coupling the collector electrodes of said first and second transistors to said second and first feedback control circuits, respectively, each of said first and second output circuits including a pair of output transistors having base electrodes coupled together and to the collector electrodes of said first and second transistors, respectively, the output transistors in said first and second output circuits being arranged to pass feedback current to the feedback control circuit associated with said second and first transistors, respectively, whenever said first and second transistors assume highly conducting states, respectively; and means for applying operating potential to the second ends of said impedances and feedback control circuits.

12. The multivibrator circuit defined in claim 11 wherein said output transistors have emitter electrodes connected together and separate collector electrodes and each of said output circuits further includes a capacitor having one end coupling the emitter electrodes of the associated output transistors and the other end arranged to receive a reference potential, the collector electrode of one output transistor receiving operating potential and the collector electrode of the other output transistor being coupled to the associated feedback control circuit.

13. The multivibrator circuit defined in claim 11 wherein each of said output circuits further includes a Zener diode coupled between the collector and emitter electrodes of a first of the output transistors, means for applying operating potential to the collector of said first output transistors, and means for coupling the collector of the second of said output transistors to the associated feedback control circuit.

14. The multivibrator circuit defined in claim 13 wherein said first and second transistors have their base electrodes coupled to ground.

References Cited in the file of this patent

UNITED STATES PATENTS

| | | |
|---|---|---|
| 2,644,887 | Wolf | July 7, 1953 |
| 2,724,780 | Harris | Nov. 22, 1955 |
| 2,750,502 | Gray | June 12, 1956 |
| 2,787,712 | Priebe | Apr. 2, 1957 |